United States Patent [19]

Horsting

[11] 4,453,450
[45] Jun. 12, 1984

[54] FLUID MOTOR

[75] Inventor: John J. Horsting, South Bend, Ind.

[73] Assignee: The Bendix Corporation, Southfield, Mich.

[21] Appl. No.: 332,075

[22] Filed: Dec. 18, 1981

[51] Int. Cl.³ .................... F15B 20/00; F15B 21/00; F15B 9/10

[52] U.S. Cl. ............................................ 91/5; 91/28; 91/376 R

[58] Field of Search .............. 91/5, 372, 373, 391 A, 91/369 A, 376 R, 28

[56] References Cited

U.S. PATENT DOCUMENTS

| | | | |
|---|---|---|---|
| 3,188,920 | 6/1965 | Hager | 91/434 |
| 3,321,916 | 5/1967 | Cripe | 91/373 |
| 3,482,485 | 12/1969 | Abbott | 91/372 |

*Primary Examiner*—Paul E. Maslousky
*Attorney, Agent, or Firm*—Leo H. McCormick, Jr.; Ken C. Decker

[57] ABSTRACT

A fluid motor (10) having a housing (12) with first (14), second (16) and third (18) chambers therein. A first partition (22) separates the first chamber (14) from the second chamber (16). A second partition (24) separates the second chamber (16) from the third chamber (18). The third chamber (18) is connected to a source of fluid under pressure. A valve mechanism (91) controls the communication of the source of fluid between the second (16) and third (18) chambers. A poppet valve (42) allows the fluid to flow into the first chamber (14) from the second chamber (16). The first chamber (14) is connected to the third chamber (18) through a check valve (118). The valve mechanism (91) responds to an operator input signal by terminating fluid communication between the second (16) and third (18) chambers and initiating communication of the second chamber (16) with the atmosphere to allow fluid to escape and create a pressure differential across the first (22) and second (24) partitions. This pressure differential holds the first partition (22) stationary but acts on the second partition (24) to develop an output force corresponding to the input signal. Should the source of fluid be interrupted, the stored fluid in chamber (14) flows into chamber (18) to assure for the continued development of an operational pressure differential.

11 Claims, 1 Drawing Figure

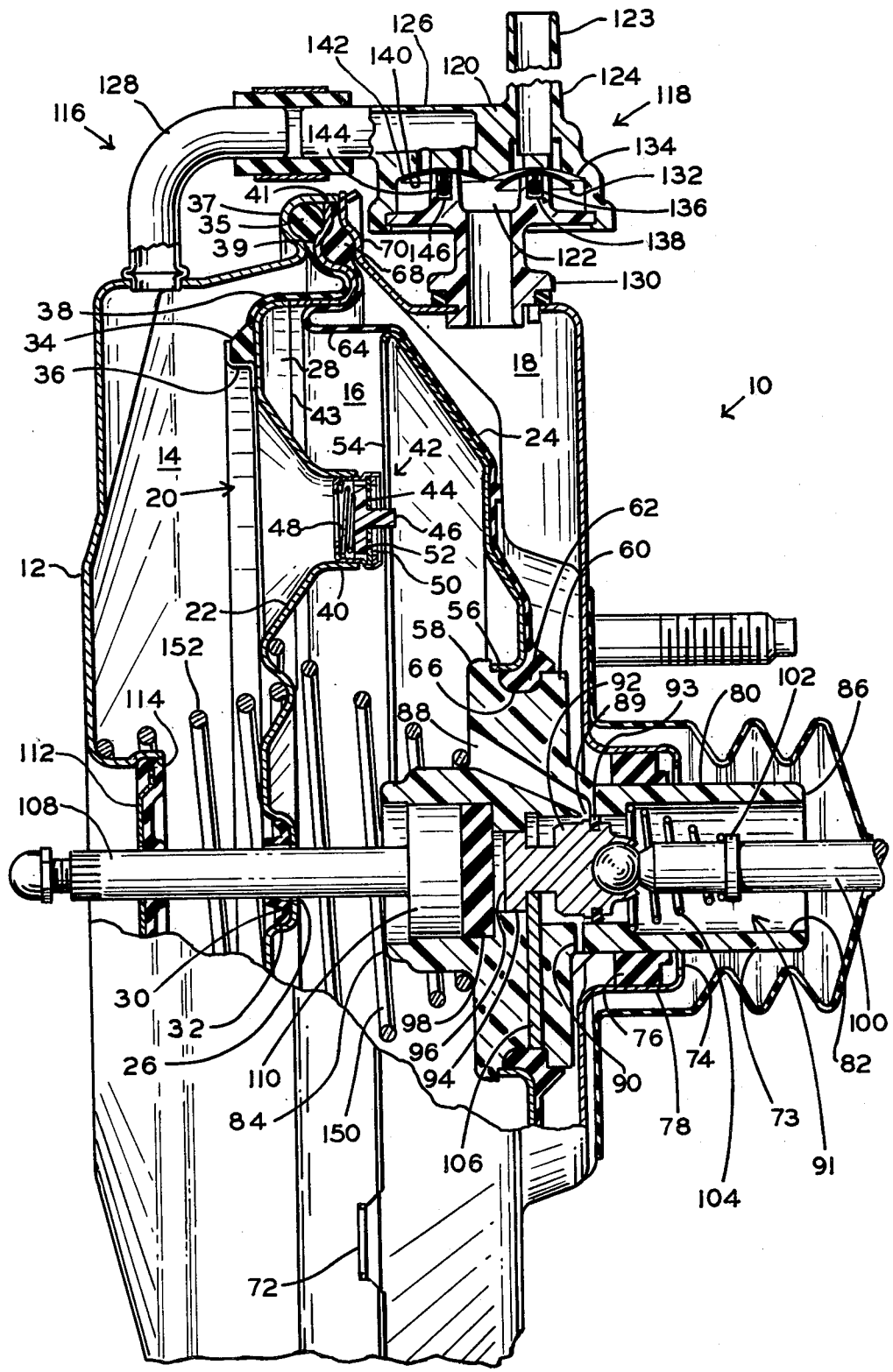

FLUID MOTOR

This invention relates to a fluid motor for providing a power assist in effecting a brake application.

The fluid motor has a housing with a cavity therein which is divided into first, second and third chambers by a wall arrangement. A valve mechanism connected to the valve arrangement responds to an input signal for controlling the communication of a first fluid to the first, second and third chambers during a first mode of operation and for controlling the communication of a second fluid to the second chamber in a second mode of operation to create a pressure differential across the wall arrangement. The pressure differential acts on the wall arrangement to develop an output force corresponding to an input force applied to the valve mechanism during the second mode of operation.

U.S. Pat. No. 3,188,920 discloses a fluid motor having a housing divided into three chambers by two walls with the working chamber located between two reference chambers. One wall is connected to an output member while the other wall is connected to the input member. In response to an input force fluid is communicated to the working chamber and develops a pressure differential across the two walls. This pressure differential acts on the first wall to provide the output member with a force to effect a brake application. In addition, the pressure differential acts on the second wall to provide the input member with a reactionary force to inform the operator of the output force created across the first wall.

In this type of fluid motor after each brake application, the reference chambers and working chambers are connected. If either the reference fluid or working fluid is depleted, the operational pressure differential is proportionally decreased thus eliminating the power assist for effecting a brake application.

SUMMARY OF THE INVENTION

The fluid motor of the invention disclosed herein is characterized in that the first wall member which is located between the first and second chamber responds to the pressure differential by remaining substantially stationary during the second mode of operation to retain a fixed quantity of the operational fluid while the second wall which is located between the second and third chambers responds to the pressure differential to produce the output force. The first chamber is connected to the third chamber. Should the source of the operational fluid terminate, fluid from the first chamber is communicated to the third chamber to assure continued development of the pressure differential a minimum number of times.

According to another feature, the fluid motor is further characterized by the first wall having a poppet member which, the second wall engages to release the stored fluid in the first chamber and thereafter allow the pressure differential to move the second wall into the first chamber to meet an operational requirement corresponding to an input force applied to the valve mechanism during the second mode of operation.

One advantage for this invention results from the retention of a fluid quantity of operational fluid in a first chamber of a fluid motor to assure for the development of a minimum number of brake applications with a power assist should the source of the operational fluid be terminated.

Another advantage of this invention for a fluid motor occurs in that the first wall which defines the storage chamber has a poppet member which allows an operational fluid to flow into the storage chamber. When the pressure differential moves the second wall a predetermined distance, the poppet member is engaged to release the operational fluid from the first chamber and permits the second wall to move into the first chamber and meet the stroke requirement of the fluid motor established by the input signal.

It is an object of this invention to provide a fluid motor with a wall arrangement having a first partition and a second partition that separates a cavity thereon into first, second and third chambers. A poppet located in the first partition allows a first fluid to flow into the first chamber from the second and third chamber. A valve mechanism allows a second fluid to flow into the second chamber in response to an input signal and create a pressure differential across the first and second walls. The pressure differential which acts on and moves the second partition to produce an output force, holds the first partition in a stationary position to maintain a storage reservoir for the first fluid. The first fluid from the first chamber being communicated to the second and third chambers on termination of the source of the first fluid to assure for the continued development of a minimum number of pressure differentials in response to an input signal.

BRIEF DESCRIPTION OF THE DRAWING

The invention will now be described with reference to the accompanying drawing showing a sectional view of a fluid motor having a cavity therein separated by a wall arrangement to define a reservoir, a reference chamber, and a working chamber therein.

DETAILED DESCRIPTION OF THE INVENTION

The fluid motor 10 has a housing 12 with a cavity therein divided into a first chamber 14, a second chamber 16, and a third chamber 18 by wall arrangement 20. The wall arrangement 20 has a first partition 22 and a second partition 24. The first partition 22 separates the first chamber 14 from the second chamber 16 and the second partition 24 separates the second chamber 16 from the third chamber 18.

The first partition 22 has a backing plate with a central opening 26 and a rearwardly projecting peripheral surface 28. A seal 30 is located in a groove 32 adjacent the central opening 26 while a bead 34 on diaphragm 38 snaps into a groove 36 adjacent the peripheral surface 28. A bead 35 on diaphragm 38 is located between groove 37 in housing 12 and groove 39 in annular stop 41 to separate chamber 14 from chamber 16. The first partition 22 has an opening 40 through which chamber 14 is connected to chamber 16.

A poppet member 42 located in opening 40 controls flow communications between chambers 14 and 16. Poppet member 42 has an annular member 44 with a stem 46 that extends into chamber 16. A spring 48 which acts on annular member 44 urges face 52 toward a seat 50.

The second partition 24 has an annular backing plate 54 with a lip 56 held against a shoulder 58 on a hub member 60 by locating a bead 62 on a diaphragm 64 in a groove 66. A bead 68 on diaphragm 64 is located between groove 39 on annular stop 41 and groove 70 in housing 12 to separate chamber 16 from chamber 18. A series of tabs 72 (only one is shown) are crimped in such a manner that the rear shell and the front shell of housing 12 compresses beads 35 and 68 into grooves 37, 39, and 70 to seal the housing 12 from the surrounding environment.

Hub 60 has a projection 73 that extends opening 74 in housing 12. A bearing 76 retained in protrusion 78 engages surface 80 on projection 73 to guide the hub movement within the cavity of housing 12. Hub 60 has a stepped bore 82 that extends from end 84 to end 86. A first passage 88 connects bore 82 with chamber 16 and a second passage 90 connects bore 82 with chamber 18.

A plunger 92 located in bore 82 has a guide surface 94 with a face 96 positioned adjacent a reaction disc 98. Push rod 100 attached to plunger 92 has a shoulder 102 that retains a return spring 104. Spring 104 acts on push rod 100 to move guide surface 94 into engagement with key 106 to retain the plunger 92 in bore 82.

An output push rod 108 has a head 110 on a first end that is located in bore 82 and a second end that extends through opening 26 in the first partition and a bearing seal devices 112 located in opening 114 in housing 12.

Chamber 14 is connected to chamber 18 through an external flow path circuit 16. The external flow path circuit 116 has a check valve device 118. The check valve device 118 has a housing 120 with a passage 122 therein having a first port 124 connected to a source of fluid under pressure, a second port 126 connected to conduit 128 that extends from chamber 14 and a third port 130 connected to chamber 18. A first disc shaped poppet 132 is located over seat 124 adjacent port 124 by projection 136 being retained in slot 138. Similarly a second disc shaped poppet 140 is located over a seat 142 adjacent port 126 by a projection 144 located in slot 146.

MODE OF OPERATION OF THE INVENTION

The fluid motor 10 is designed to provide a power assist for operating a brake in a vehicle. This vehicle is being equipped with a pump (not shown) to compress a source of fluid to a predetermined pressure level. The pump is connected to port 124 by a conduit 123. Fluid under pressure enters passage 122 after moving disc shaped poppet 132 off seat 134. The pressure of the first fluid in passage 122 acts on and holds disc shaped poppet 140 against seat 142. Thus, the fluid from the source passes through port 130 into chamber 18. The fluid under pressure passes through passage 90 into bore 82 and out passage 88 into chamber 16. When the pressure in chambers 16 and 18 is substantially equalized, return spring 150 urges the second partition 24 to the rest or first position shown in the drawing. If a pressure differential exists between the fluid in chambers 16 and 14, the fluid under pressure in chamber 16 overcomes spring 48 and moves face 52 away from seat to allow fluid to flow into chamber 14. Spring 48 is designed to have minimal force, thus the fluid pressure in chamber 14 substantially equals the fluid pressure in chamber 16. During the period of time that fluid flows from chamber 16 into chamber 14 return spring 152 acts on and holds partition 22 against surface 43 on the annular stop 41. When the fluid pressure in chambers 14, 16 and 18 is equal, fluid flow through check valve 118 is temporarily terminated and the fluid motor is suspended in its rest position as shown in the drawing.

When an operator desires to effect a brake application and use the fluid motor 10 to provide a power assist, an input signal or force is applied to push rod 100 to indicate a second mode of operation. The input force on push rod 100 moves lip 93 on plunger adjacent passage 89 to interrupt fluid communication between chambers 16 and 18. Further movement of plunger 92 moves lip 93 past opening 89 to passage 88 to allow fluid in chamber 16 to escape to the surrounding environment and be replaced with air. With air in chamber 16 and fluid under pressure in chambers 14 and 18, a pressure differential is created across the first and second partitions 22 and 24. The pressure differential acting on the first partition 22 holds the partition in a substantially fixed position against surface 43 on the annular stop 41. At the same time, the pressure differential acts on the second partition 24 to develop a force that is transmitted to push rod 108 by way of hub 60 and reaction disc 98. The resistance to movement of push rod 108 is carried through reaction disc 98 into face 96 on plunger 92. When the resistive force is equal to the input signal, a balance condition exists and thereafter a slight increase in the reactionary force moves the plunger to interrupt replacement of fluid in chamber 16 by air from the surrounding environment.

Under most operational conditions, the output stroke is below a predetermined value and the travel of the second partition 24 within the second chamber 16 is sufficient to meet the operational demands corresponding to the input signal. However, under certain conditions push rod 108 needs to move farther to provide an attached master cylinder (not shown) with more stroke to meet the requirement set forth in the input signal. In such an instance, the second partition 24 engages stem 46 on poppet valve 42 to allow fluid in chamber 16 to be replaced by air in chamber 14 thus eliminating the pressure differential across partition 22. Thereafter the pressure differential acting on the second partition 24 after overcoming spring 152 moves the first and second partitions to provide push rod 108 with the stroke required to meet the input signal.

Under normal operating conditions, the fluid in chamber 14 is retained since the movement of the second partition 24 toward the second chamber is sufficient to meet the operational requirement established by the input signal. On termination of the input signal, spring 104 moves plunger 92 such that lip 93 moves past opening 89 and chambers 16 and 18 are connected to each other. As the pressure differential across partition 24 is reduced, return spring 150 moves the hub 60 to the rest position shown in the drawing.

Should the source of fluid under pressure from the pump terminate, i.e., when the vehicle engine is not operating, the fluid pressure in chambers 16 and 18 after equlization occurs is lower than the fluid pressure in chamber 14. This fluid pressure differential is reflected across disc shaped poppet 140 causing the poppet 140 to move away from the seat 142 and allow fluid stored in chamber 14 to flow through passage 122 for distribution to chambers 16 and 18. After a period of time the fluid in chambers 14, 16 and 18 stabilizes at approximately the same pressure. When an input signal is applied to push rod 100, plunger 92 moves to interrupt communication between chambers 16 and 18 through bore 82 and passages 88 and 90. Thereafter fluid chamber 16 is vented to the atmosphere through passage 88 and bore 82 to create a pressure differential across partitions 22 and 24. This pressure differential acts on partition 22 to hold it stationary and on partition 24 to provide the output force for moving push rod 108 to provide the power assist needed to effect a brake application. After the brake application, return spring 104 moves plunger 92 to interrupt communication of air from bore 82 and open communication between chambers 16 and 18 by way of passages 88 and 90. As the fluid pressure in chambers 16 and 18 equalizes, a pressure differential occurs with the fluid in chamber 14. If the pump or source of operational fluid is still unavailable, this pressure differential causes the disc shaped poppet 140 to move from seat 142 and allows fluid stored in chamber 14 to flow into chamber 18. After a period of time, the fluid in chambers 14, 16 and 18 stabilizes. Thereafter, in response to an input signal, a pressure differential between the fluid in chamber 18 and air in chamber 16 can occur to provide the power assist to effect a brake application.

Chamber 14 is sized to be about equal in size with the change in size of chamber 16 as a result of a brake application. The fluid pressure in chambers 14 and 18 is retained during a brake application. When a brake application terminates, the fluid pressure in chambers 14 and 18 is proportionally reduced by the size of chamber 16. However, even after a series of brake applications with the source of fluid in an inoperative condition, a certain fluid pressure is still present in chambers 14 and 18 to provide for equalization and a resulting pressure differential with air during a brake application.

When the source of fluid under pressure is reestablished, the fluid under pressure is communicated to chamber 18. With the valve mechanism 91 in rest position, pressure equalization occurs between chambers 16 and 18 by way of passages 88 and 90 and bore 82. If the fluid pressure in chamber 16 is greater than the fluid pressure in chamber 14, poppet 42 opens to allow the fluid to flow into chamber 14 where it is stored for use at a later time should the pump terminate and the operator desire to effect a brake application.

I claim:

1. In a fluid motor having a housing with a cavity therein divided into first, second and third chambers by a wall arrangement, first valve means for controlling communication of a fluid between said first and second chambers, and second valve means for controlling communication of said fluid between said second and third chambers in a first mode of operation, said second valve means being responsive to an input signal for communicating said fluid from said second chamber to a surrounding environment in a second mode of operation to create a first pressure differential across said wall arrangement between said first and second chambers and a second pressure differential across said wall arrangement between said second and third chambers, the wall arrangement being characterized by a first member located between said first and second chambers and a second member located between said second and third chambers, said second pressure differential acting on and moving said second member toward said first member to produce an output force while said first pressure differential normally holds said first member in a substantially stationary position to establish a storage reservoir for said fluid.

2. In the fluid motor, as recited in claim 1, wherein said first chamber is characterized by retaining a fixed quantity of said fluid as a reserve which is communicated through third valve means to said third chamber in the absence of communication of said fluid from a source to assure the development of said second pressure differential for a minimum number of times during said second mode of operation.

3. In the fluid motor, as recited in claim 1, wherein said first member is characterized by retaining a fixed quantity of said fluid in the first chamber as a reserve in the absence of the availability of said fluid from a source, said reserve being communicable through a third valve means from the first chamber to the third chamber on termination of the input signal to thereafter suspend the wall arrangement in said fluid.

4. In the fluid motor, as recited in claim 1 wherein said wall arrangement is further characterized by a first spring that urges the first member toward a stop and away from the housing to define a limit for the first chamber and a second spring that urges the second member away from the first member and toward the housing to define a limit for the second chamber between the first and second members and for the third chamber between the second member and the housing.

5. In the fluid motor, as recited in claim 4 wherein said first valve means is characterized by a poppet valve which allows said fluid to freely flow from said second chamber to said first chamber, said second valve means is characterized by a control valve which allows said fluid to freely flow from said third chamber to said second chamber during said first mode of operation and from said second chamber to atmosphere or surrounding environment during said second mode of operation, and said third valve means is characterized by a check valve which allows said fluid to freely flow from said first chamber to said third chamber in the absence of said fluid from said source.

6. In the fluid motor, as recited in claim 1 wherein said first member is further characterized by a first partition having an opening therein, said first valve means being located in the opening to control fluid communication between the first and second chambers, a first diaphragm having a first bead retained by the housing and a second bead retained in a groove on the first partition, and a stop, said first pressure differential urging said first partition toward said stop until said second pressure differential moves said second member into engagement with said first valve means, said movement of said second member by said pressure differential thereafter activating said first valve means to allow the fluid to flow into the second chamber from said first chamber and dissipate said first pressure differential across the first member and thereafter allow said second pressure differential across the second member to move an output member a further distance in response to the input signal.

7. In the fluid motor as recited in claim 1, wherein said first valve means is characterized by a poppet valve having a stem member which is urged against a seat surrounding an opening in said first member by a resilient member, said second member engaging said stem after moving a predetermined distance to allow air from the surrounding environment to replace said fluid in said first chamber and thereafter allow said second member to continue movement away from said third chamber.

8. In a fluid motor having a housing with a cavity therein divided into a control chamber and a power chamber by a wall arrangement and a valve mechanism for controlling communication of a fluid from a source and said power chamber to said control chamber in a rest condition and from said control chamber to the atmosphere in an operational condition to develop a first operational pressure differential between said control chamber and said power chamber as a function of an input signal, the improvement wherein said wall arrangement comprises:
- a first partition for separating said control chamber into a first section and a second section, said first partition having an opening therein for connecting said first section with said second section;
- a second partition for separating said second section from said power chamber; and
- a first poppet means located in said opening, said first poppet means allowing said fluid to freely flow from said second section to said first section in said rest condition, said fluid being communicated from said second section through said valve mechanism in response to said input signal to develop said first operational pressure differential between the fluid in said second section and said power chamber and a second operational pressure differential between the fluid in said first and second section, said first operational pressure differential acting on said second partition to produce an output force, said second operational pressure differential acting on said first partition to produce an internal force that holds said first partition in a stationary position to establish a reservoir for said fluid in said first section, said first section being connected to said power chamber to provide said power chamber with said fluid in the absence of the availability of said fluid from said source to provide for the subsequent development of an operational first pressure differential in response to a subsequent input signal.

9. In the fluid motor, as recited in claim 8, wherein said first operational pressure differential moves said second partition toward said first partition until said second partition engages said first partition and moves said first poppet means to allow said fluid in said first section to be vented into said second section and thereby eliminate said second operational pressure differential and said resulting internal force, said elimination of the internal force thereafter allowing simultaneous movement of said first and second partitions through the action of said first operational pressure differential on said second partition to produce an output force corresponding to a predetermined level of said input force.

10. In the fluid motor, as recited in claim 9 further including:
- a check valve having a housing with a passage therein, said passage having a first port connected to said source of fluid, a second port connected to said first section of said control chamber, and a third port connected to said power chamber;
- said check valve having a second poppet means associated with said first port that only allows the fluid to flow from the source into said passage and out said third port for distribution to said power chamber, and a third poppet means associated with said second port to prevent the fluid from flowing to said reservoir through said second port, said third port means allowing said fluid in said first section to flow through said second port through said passage out said third port and into said power chamber in the absence of the fluid at said source.

11. In the fluid motor, as recited in claim 8 further including:
- a return spring located between said first and second partitions for urging said second partition toward a rest position in the absence of an input signal; and
- a second return spring located between said housing and said first partition to hold said first partition against a stop until said first pressure differential moves said second partition into engagement with said first partition and activates said first poppet to release said fluid from said first section into said second chamber to eliminate said second operational pressure differential and thereafter permit said second partition to move an additional distance in response to said first pressure differential.

* * * * *